(12) United States Patent
Rafalovich et al.

(10) Patent No.: US 9,920,963 B1
(45) Date of Patent: Mar. 20, 2018

(54) SYSTEM FOR CONDITIONING AIR WITH TEMPERATURE AND HUMIDITY CONTROL AND HEAT UTILIZATION

(71) Applicants: Alexander P Rafalovich, Sarasota, FL (US); Vladimir G Bulygin, St Petersburg (RU)

(72) Inventors: Alexander P Rafalovich, Sarasota, FL (US); Vladimir G Bulygin, St Petersburg (RU)

( * ) Notice: Subject to any disclaimer, the term of this patent is extended or adjusted under 35 U.S.C. 154(b) by 0 days.

(21) Appl. No.: 15/404,911

(22) Filed: Jan. 12, 2017

(51) Int. Cl.
*F25B 13/00* (2006.01)
*F25B 25/00* (2006.01)
*F25B 43/00* (2006.01)
*F25B 41/04* (2006.01)

(52) U.S. Cl.
CPC ........... *F25B 13/00* (2013.01); *F25B 25/005* (2013.01); *F25B 41/04* (2013.01); *F25B 41/046* (2013.01); *F25B 43/006* (2013.01); *F25B 2341/0662* (2013.01); *F25B 2400/0415* (2013.01); *F25B 2400/13* (2013.01)

(58) Field of Classification Search
CPC .......... F25B 13/00; F25B 25/005; F24F 3/153
See application file for complete search history.

(56) References Cited

U.S. PATENT DOCUMENTS

| 4,843,832 A * | 7/1989 | Yamada | F16K 31/06 165/104.21 |
| 7,137,270 B2 * | 11/2006 | Lifson | F25B 13/00 62/196.4 |
| 7,155,921 B2 * | 1/2007 | Lee | F24F 5/001 236/44 A |
| 7,591,145 B1 * | 9/2009 | Wiggs | F24F 3/14 62/176.6 |
| 8,151,579 B2 * | 4/2012 | Duncan | F28F 1/00 165/228 |
| 8,347,644 B2 * | 1/2013 | Liu | F24F 3/065 62/160 |

* cited by examiner

*Primary Examiner* — Filip Zec

(57) ABSTRACT

The invention presents air-conditioning system with chiller that provides, when operated in the cooling mode, cooling hardware for conditioning space and a heat exchanger for cooling and dehumidification of ambient air in supply air stream with cold liquid. In addition, the invention offers a method and design of a heat utilization system. The method incorporates refrigeration cycle with two consecutive expansions, two expansion devices, and a heat exchanger operating as a second condenser. The method can be used for air conditioners and chillers reheating over-chilled for dehumidification indoor and supply air. The method and design allow energy efficient heat utilization with variable amount of utilized heat.

12 Claims, 6 Drawing Sheets

SYSTEM FOR CONDITIONING AIR WITH TEMPERATURE AND HUMIDITY CONTROL AND HEAT UTILIZATION

BACKGROUND OF THE INVENTION

The present invention relates to air conditioning systems controlling temperature and humidity of air inside of residential, commercial, and industrial buildings and structures. In the heating mode, heat is delivered to a building either by an air conditioning system operating as a heat pump or by an alternative source of heat such as gas, electrical, solar, etc. heaters. In the cooling mode, the system absorbs heat from the "indoor air" and deliver this heat to ambient. Air conditioning systems in many buildings, especially, multi-story buildings, commercial buildings, hospitals, schools, supermarkets, etc. include supply-exhaust ventilation, a liquid circuit, and a refrigeration circuit. Liquid, mostly water or brine, used as a secondary refrigerant, circulates in the building providing fan-coil heat exchangers with heat from heated liquid in the heating mode or cold from cooled liquid in the cooling mode. In turn, fan-coil heat exchangers heat or cool air flowing through them and, therefore, warm or chill different parts of the building. In alternative design, a chiller may supply warmed or chilled liquid to other equipment, for example, local air conditioners or heat pumps wherein warmed liquid transfers heat to refrigerant in evaporators in the heating mode, or chilled liquid absorbs heat from refrigerant in condensers in the cooling mode.

Most of building air conditioners and chillers operate according to the Rankin refrigeration cycle. While majority of systems that condition air in buildings operate in both the heating and cooling modes, the present invention mostly relates to the cooling mode. In the cooling mode, the air is chilled and dehumidified while passing through cold surfaces of evaporators or fan-coil heat exchangers. In most air conditioners, the system running time is the only controlled parameter that is driven either by humidity setting or by temperature setting. Thus, humidity and temperature are never controlled independently of each other. While air conditioner runs, there is a relatively rigid correlation between percentage of cooling capacity dedicated to temperature reduction and percentage of cooling capacity for moisture condensation at any combination of indoor air humidity and temperature. The outdoor heat warms buildings primarily through the walls, roof, and windows while the moisture comes with outdoor air. Therefore, humidity in the room depends mostly on outside air influx when temperature setting is fixed. In a single-family residential building, air exchange rate because of leaks, cracks, open doors, etc. is between 0.5-2.0 volumes per hour. However, in the buildings with supply-exhaust ventilation air exchange rate is from minimum 4 to as high as 30. With so large infiltration of outside air to the building on a hot humid day, air influx may considerably increase indoor air relative humidity exceeding a recommended limit of 60% and, sometimes, even 70%. Inhabitants of such indoor environment feel discomfort; besides, high humidity may upsurge water accommodation in air ducts and mold on the walls. In order to reduce humidity, the indoor temperature is generally set below comfortable level to force the conditioning systems for longer run with higher percentage of cooling capacity spent on moisture condensation.

In this scenario, besides inhabitant comfort reduction, the air-conditioning system experiences increase in energy consumption and potential additional difficulties in draining considerable amount of condensed moisture from heat exchangers installed in the rooms.

Thus, development of a system with indoor air humidity control independent of temperature represents an important task for designers of the air-conditioning system, especially, the systems with supply-exhaust ventilation. Another aspect of air conditioner or chiller operations is heat utilization, for example, to heat or, at least, preheat water for technical or domestic consumption and/or for heat use in an air-conditioning system itself to reheat over-chilled air to comfortable level.

There are several methods for monitoring and reducing humidity of the supply airflow in order to control air humidity inside rooms. In small buildings with a single air conditioner, some designers position an evaporating coil in the supply air stream. There are advantages and disadvantages of this approach. However, creating several zones with independent control of conditioned air parameters is a necessity for large buildings with multiple rooms and different comfort requirements of inhabitants. To control humidity of supply air in large buildings, in addition to a main air conditioner or chiller, a custom air conditioner is installed in the building with its evaporator placed inside of the supply air duct specifically to cool and dehumidify incoming air. The problems of such system include extra installation and maintenance expenses for additional equipment. Besides, to elevate temperature of supply air to comfortable level, while the chiller is off or air after dehumidification is too cold, additional gas or electrical heating elements are also in use. That adds to operating expenses.

To reduce power consumption, some systems use heat from heated air leaving the conditioner either with an air-to-air heat exchanger or mixing supply air with a part of hot air leaving condenser. This saves energy compared to the systems with gas or electric heaters, but, in addition to aforesaid extra installation and maintenance expenses, such systems have several other disadvantages including:

a) positioning of the refrigerant evaporating coil inside the air duct often requires lengthy refrigerant communications, that, in turn, increases energy loss, reduces reliability, and complicates maintenance;

b) the air-to-air heat exchanger for reheating over-chilled air needs special ducts and a blower to harness a part of hot air after condenser and bring it either to the heat exchanger in air supply stream for heat transfer or for mixing with over-chilled supply air;

c) high rise buildings with several technical floors for supply air ducts require either several conditioners or several evaporators with lengthy refrigerant lines and air-to-air heat exchangers or mixers.

Lately, air conditioners with a liquid desiccant circuit become popular for their high dehumidification capacity. U.S. Pat. No. 9,464,815 of Robert Uselton assigned to Lennox Industries offers an air conditioner with refrigerant and desiccant circuits. In the refrigerant circuit, refrigerant splits in two flows upstream from the evaporator. The first flow of refrigerant, enters an absorber through the first evaporating coil, and evaporates in the absorber cooling liquid desiccant that absorbs water vapor from air. The liquid desiccant is located inside the absorber case with a frame on the perimeter and membranes permeable for vapor and resistant for liquid on the sides. The second flow of refrigerant evaporates in an evaporator cooling air that circulates in the room. Air cooled in the evaporator reaches the absorber that absorbs water vapor, and then dry cooled air flows back to the room. A liquid pump moves desiccant with absorbed moisture to a desorber. Vapor refrigerant evaporated in the first evaporating coil and vapor refrigerant from the evaporator merge in a single line that goes to the compressor suction. Hot refrigerant vapor compressed in the compressor flows to a discharge line where it splits into two branches: the first branch delivers refrigerant to a desorber condensing coil located in the desorber and downstream of the desorber merges with the second branch, then refrigerant from both branches flows to the condenser. In the desorber, moisture absorbed by liquid desiccant in the absorber is evaporated from desiccant while desiccant is warmed up with heat received from the desorber condensing coil. In the condenser, refrigerant is condensed rejecting heat to ambient air flowing through the condenser. Air heated in the condenser flows around the desorber while picking up water vapor penetrated through the desorber membranes and carrying water vapor to ambient.

The design described in the U.S. Pat. No. 9,464,815 is free from many problems caused by use of an extra air conditioner, specifically, for moisture removal. However, this design has several disadvantages also. First, it is complicated and expensive. Second, membranes could have oleophilicity that leads to severe fouling of the membranes surface. Third, the membranes require maintenance, at least, dust cleaning. Forth, while the design is applicable to small buildings with limited area and number of rooms, it is not suited for large multi-story buildings because these buildings often require multiple supply and exhaust air ducts, and, therefore, delivering refrigerant coils for absorbing and desorbing moisture into/from desiccant is extremely complicated. There is also a problem with air humidity control. In spring or fall, or even on dry summer days, amount of moisture removal shall be reduced. One solution is to reduce desiccant pump speed; however, in this case, heat absorption from the desiccant condensing coil also drops that leads to reduction in amount of condensed liquid refrigerant. While there is also reduction of liquid refrigerant in the evaporator, still reduction in condensed refrigerant can trigger imbalance in amount of liquid refrigerant that, in turn, leads to loss of the cooling capacity and/or the operating efficiency decrease.

Other disadvantages of existing air-conditioning systems are relevant to the methods used for refrigerant condenser heat utilization. These methods include the following:

Use of heat delivered to users with air heated in an air-cooled condenser. As mentioned above, this method leads to additional initial and operational expenses because it requires a bulky air-to-air heat exchanger with an extra blower and special air ducts.

Use of a water-cooled heat exchanger as the condenser delivering heat from heated water to users. It is a very efficient way of utilization when users exist for all condenser heat or its considerable part. However, in most buildings, heat requirements hardly exceed 5-10% of heat available from condensing. It means that an additional water-to-air heat exchanger or a cooling tower for cooling water circulating through the condenser must be installed. Besides of additional installation and operational expenses, it may lead to condensing temperature and compressor power increase.

Installation of a dedicated water-cooled heat exchanger located either downstream of the compressor and upstream of the condenser or downstream of the condenser. Heat exchanger upstream of the condenser operates as an additional part of the condenser desuperheating refrigerant vapor and sometimes condensing a part of this vapor. It requires additional refrigerant charge. However, while there is no need in utilized heat, extra refrigerant in the condenser causes discharge compressor pressure and power increase. If additional heat exchanger is downstream of the condenser, it operates as a subcooler cooling liquid refrigerant after the condenser and utilizing heat carried by water. This method has many advantages when compared to methods discussed above. With relatively small expenses, users can get utilized heat for air temperature control and for other purposes. Besides, this design brings improvement in the refrigeration circuit efficiency. For example, only 5% of condensing load absorbed in the subcooler may increase capacity and efficiency by 10%, while the same amount of heat utilized in the heat exchanger upstream of the condenser brings improvement of less than 1%. However, use of the subcooler is restricted by level of heat utilization. Requirement in utilized heat normally varies and can drop as low as zero; at these conditions, the subcooler becomes just a container filled with liquid refrigerant. The system refrigerant charge is optimized for subcooling. Thus, reduction in evaporator capacity and because of this, reduction of liquid refrigerant in evaporator increases amount of liquid refrigerant in the condenser, in turn, that leads to condensing pressure and compressor power increase.

The present invention eliminates aforementioned disadvantages with a chiller that is energy efficient, inexpensive, reliable, universal, and convenient for maintenance. The presented system is capable of deep dehumidification of the supply air with comprehensive control of this air temperature, and very efficient utilization of heat generated by the chiller condenser.

SUMMARY OF THE INVENTION

In one embodiment of the invention, the air conditioning system includes a heat exchanger in the supply air stream that cools and dehumidifies outdoor air entering the building via supply air duct. Chiller provides said heat exchanger with cold liquid as a secondary refrigerant that absorbs latent and sensible heat from incoming air. In another embodiment, the air conditioning system includes heat exchangers for reheating supply air over-chilled for dehumidification and air in the conditioning space. The chiller provides these heat exchangers with warm water or brine that carries heat utilized from the refrigerant circuit. Yet another embodiment includes a subcooler installed downstream from the refrigerant condenser as a means for utilizing heat.

Other embodiments include a method and design of heat utilization system incorporating a new refrigeration cycle with two consecutive expansions allowing energy efficient heat utilization with variable amount of utilized heat. The method can be used both for an air conditioner circulating air through its evaporator in the conditioning space and for a chiller that provides hardware for conditioning air with cold liquid as a secondary refrigerant. The design includes two expansion devices, and an economizer operating as an extra condenser absorbing heat from expanded refrigerant.

BRIEF DESCRIPTIONS OF THE DRAWINGS

FIG. 1 depicts schematics of an air conditioning system with a chiller providing cold liquid to a liquid-cooled heat exchanger in the supply airflow duct, and to the means for conditioning space inside the building.

FIG. 2 also depicts schematics with the chiller providing cold liquid to a liquid-cooled heat exchanger in the supply airflow duct and for conditioning space inside the building. In addition, it shows a chiller with an economizer, a heat utilization system and means to deliver heated liquid to the supply airflow and for other uses in the building.

DESCRIPTION OF THE PREFERRED EMBODIMENTS

Figure 1:
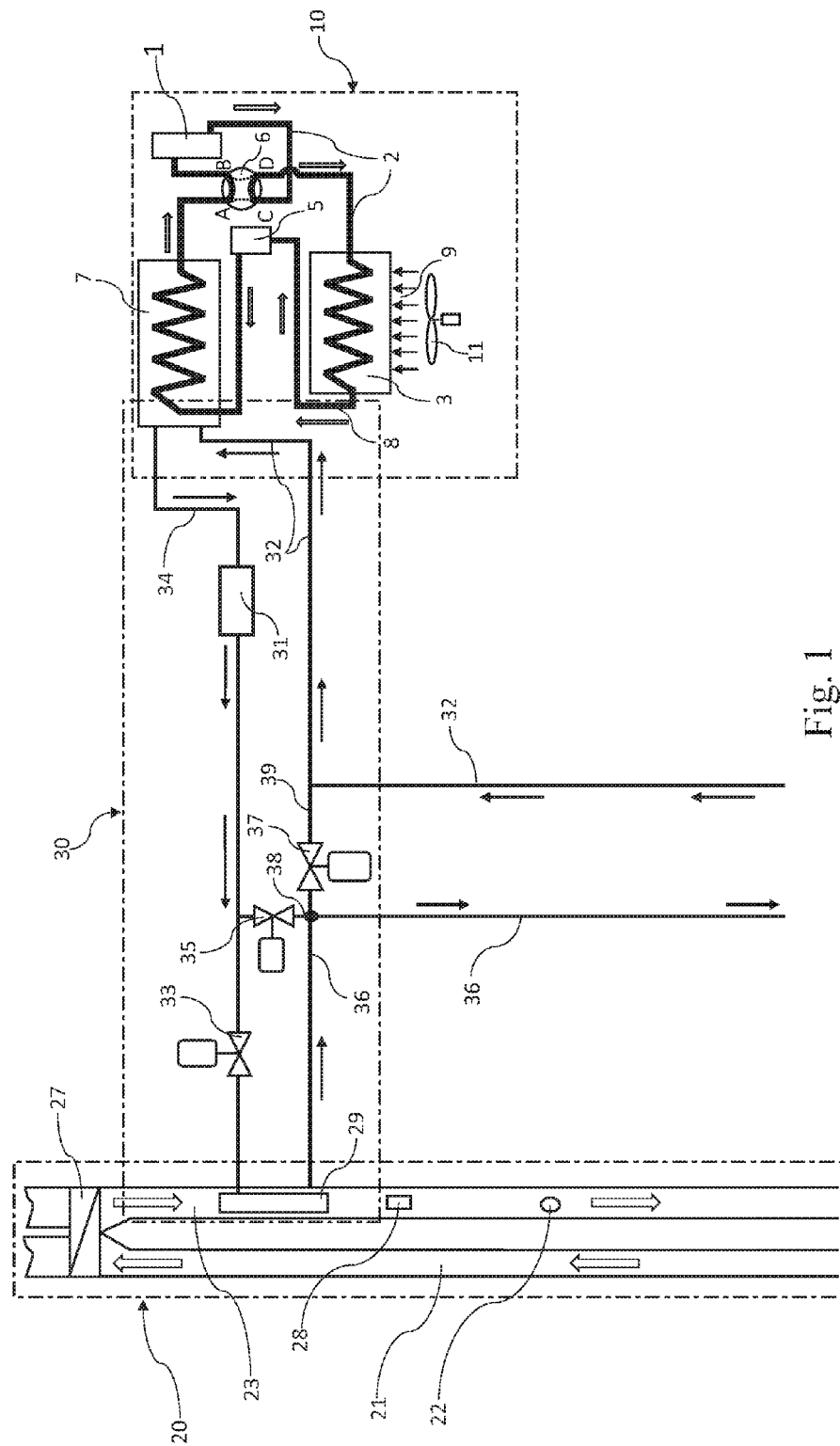
Figure 2:
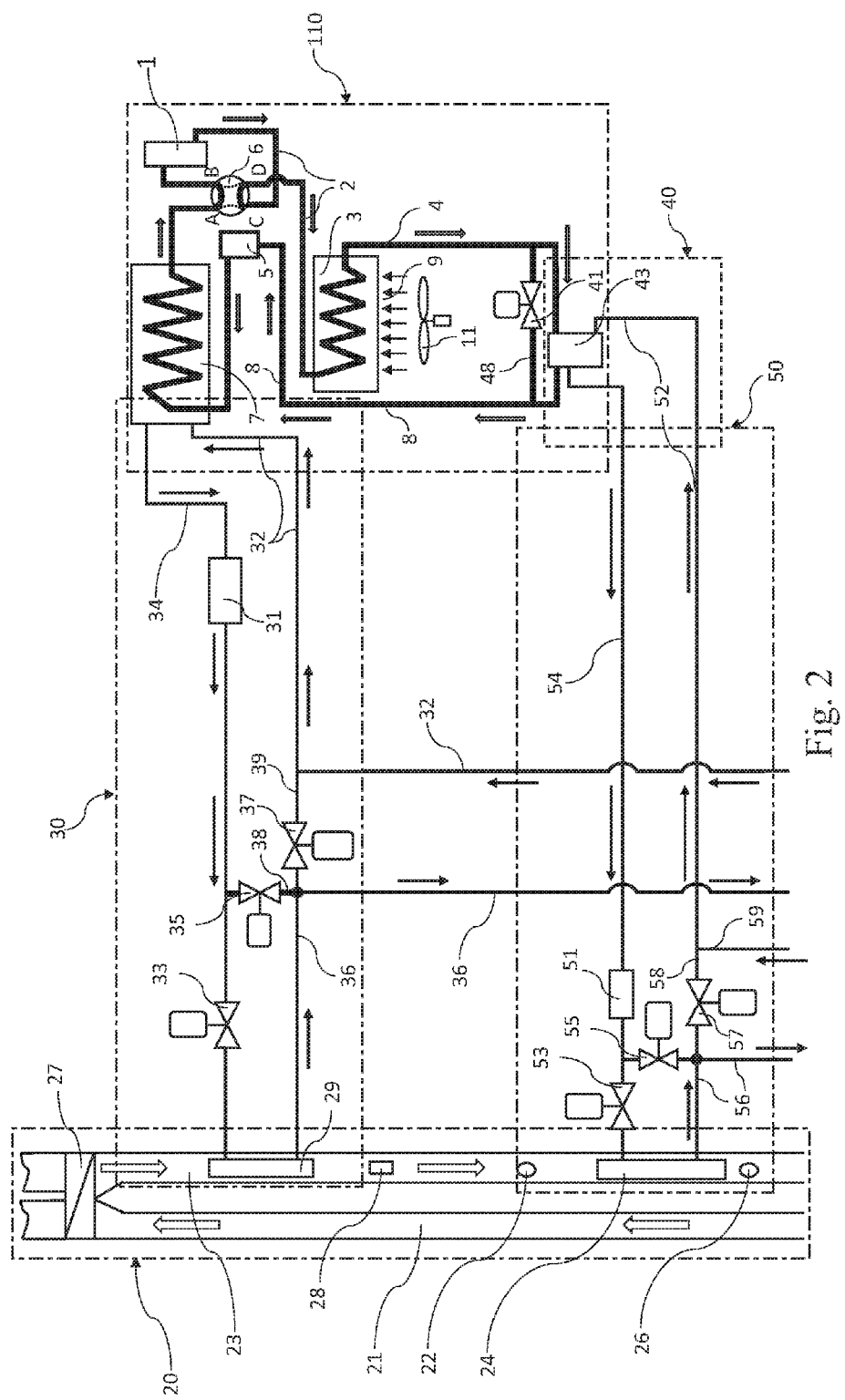

Main parts of air conditioning system schematics presented in FIGS. 1 and 2 include a chiller (or a group of chillers) 10 with water or brine most commonly based on calcium chloride, sodium chloride, or glycols as a secondary refrigerant circulating through liquid-refrigerant heat exchanger 7. Chiller 10 provides the system with cold liquid while in the cooling mode and warm liquid in the heating mode. In the cooling mode, a closed liquid circulation system 30 delivers cold liquid to a supply air duct 23 of the building exhaust-supply air system 20 and other users in the building to condition both supply air and air inside the building. FIG. 2 depicts also a system 40 that utilizes heat of the refrigeration cycle in the cooling mode to warm liquid, and a system 50 delivering this liquid to tune temperature of supply air, air temperature inside the conditioning space, and to other users of heated liquid.

Figure 3:
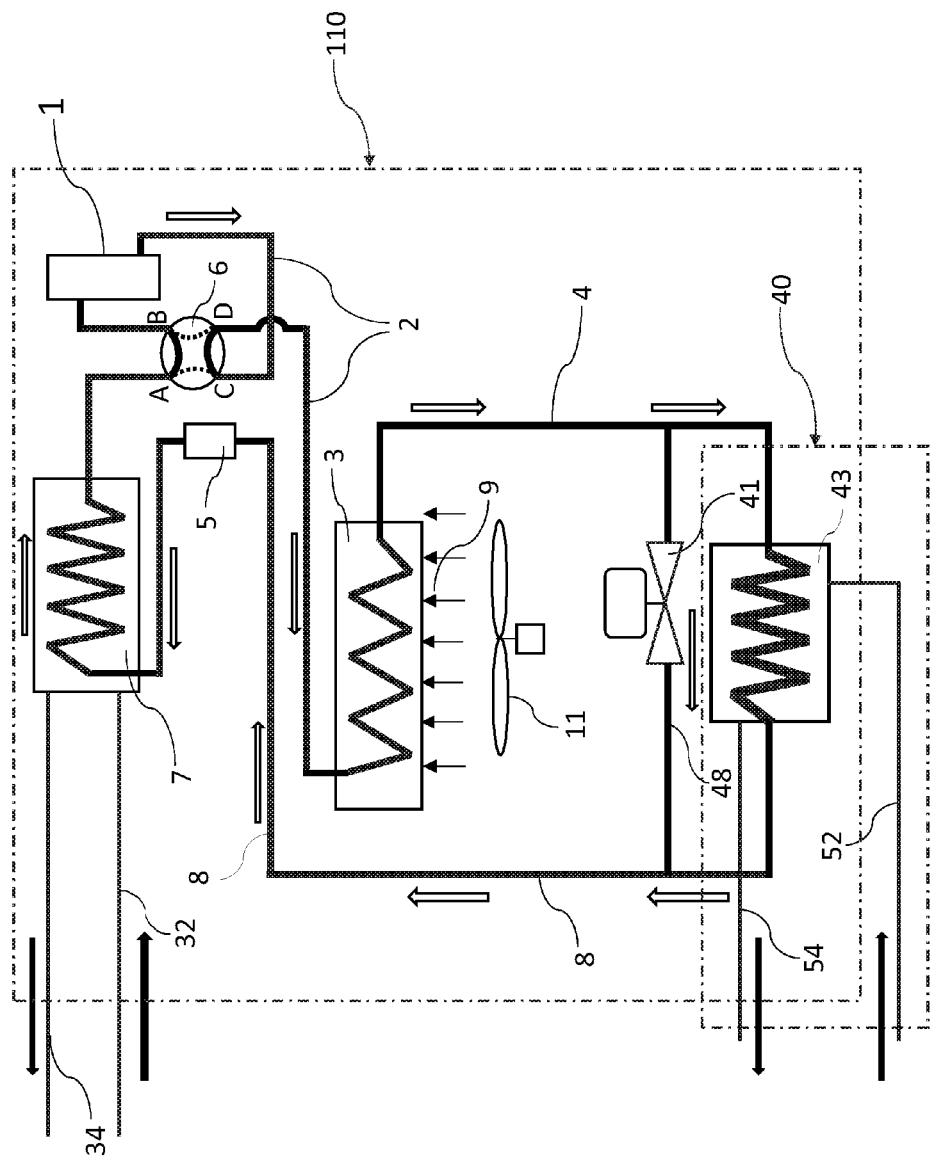
FIG. 3 depicts chiller schematics with an economizer subcooling liquid after a condenser and transferring heat utilized in warmed liquid to users.
Figure 4:
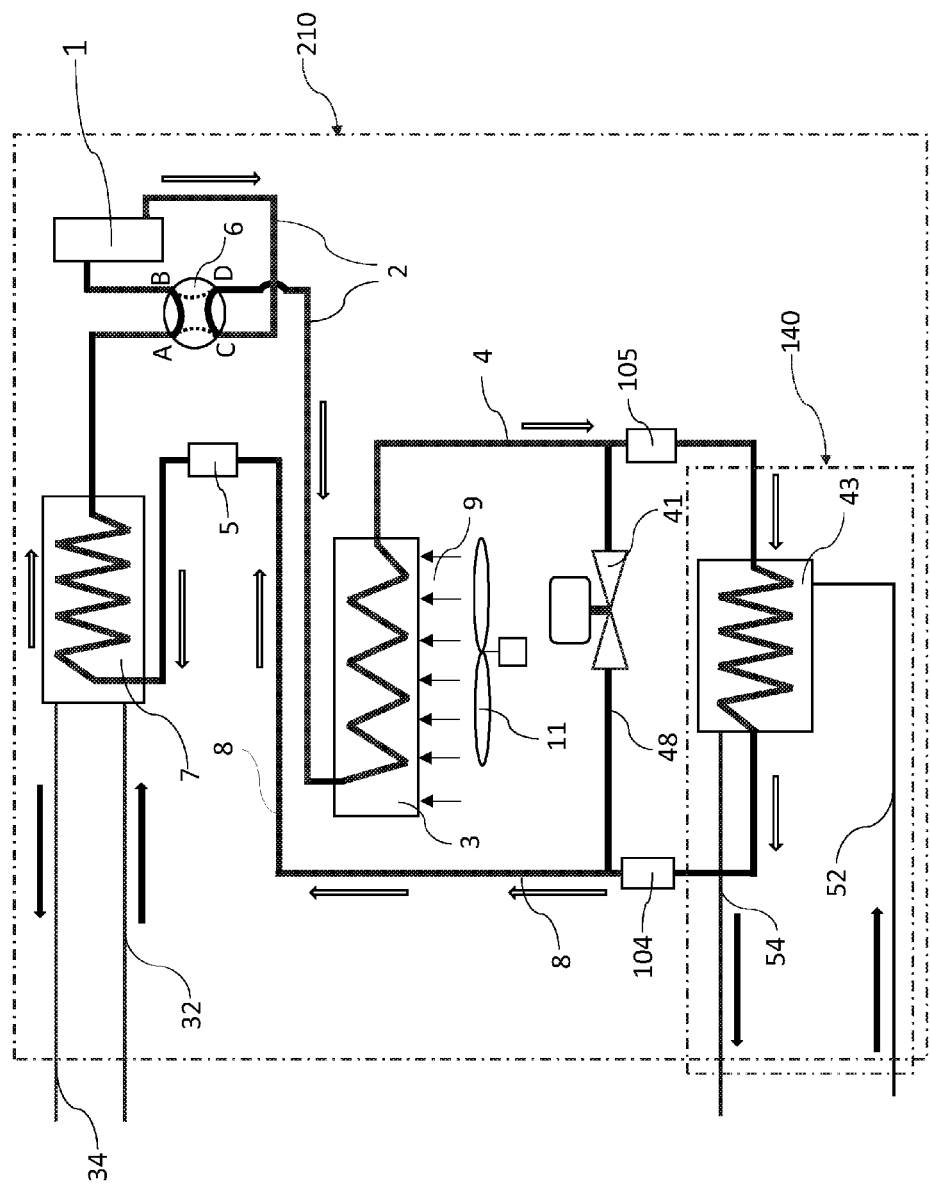
FIG. 4 depicts chiller schematics with an additional expansion device between the condenser and the economizer that operates as a second condenser recondensing vapor refrigerant after the additional expansion device and transferring heat utilized in warmed liquid to users.
Figure 6:
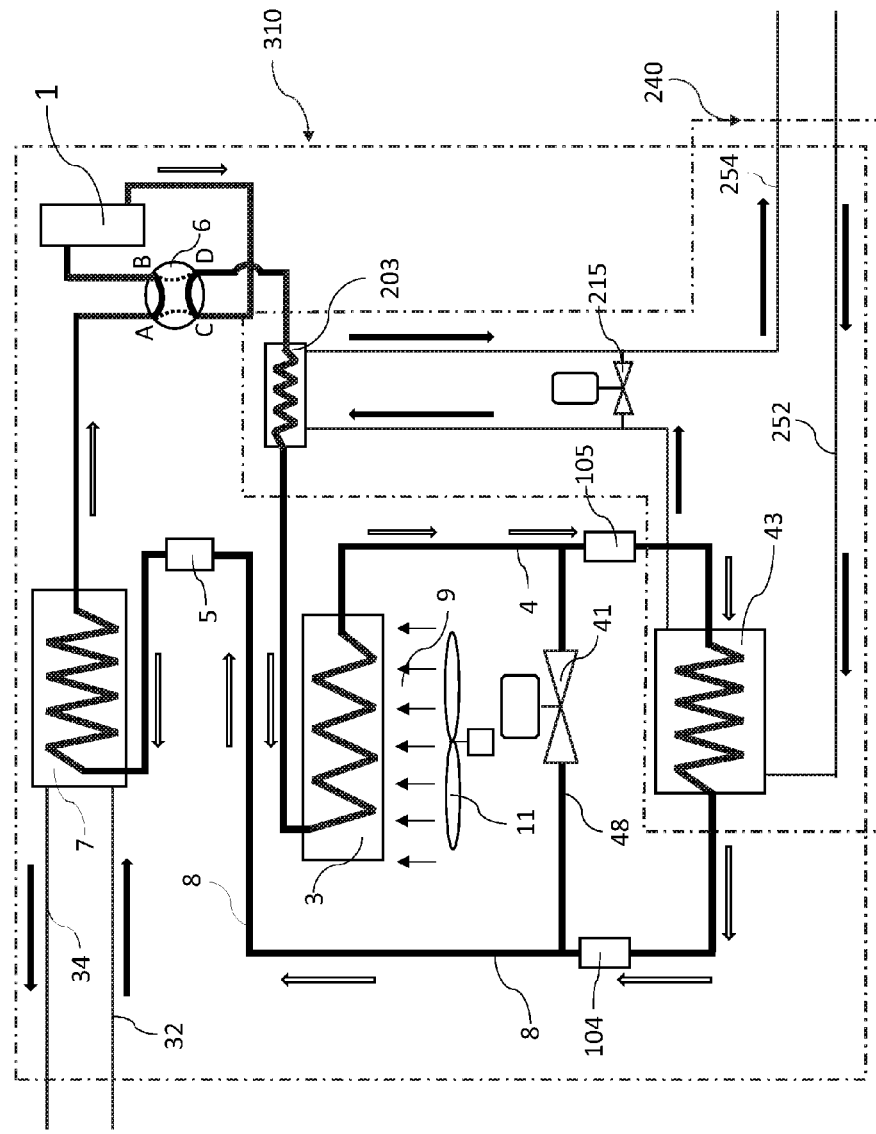
FIG. 6 depicts chiller of FIG. 4 with an additional utilization heat exchanger positioned downstream of the compressor and upstream of the condenser to further heat liquid preheated in the economizer.

Control part of the air conditioning system includes thermostats, humidistats, and other sensors. Depending on the reading of the sensors, the control starts or stops pumps, fans or compressor 1, change their speed or opens valves, etc. Most of controls are very common for air-conditioning, with the exception of a couple sensors that are specific for the present invention. In addition, FIGS. 3, 4, and 6 depict heat utilization schematics and equipment.

The chiller (or group of chillers) 10 may operate only in the cooling mode or in both the cooling and heating modes. In the heating mode, chiller 10 operates as a heat pump. For this purpose, chiller 10 has a 4-way reversing valve 6 with ports A, B, C, and D. There is no reversing valve in the chillers operating only in the cooling mode. In the cooling mode, port A is connected to port B, and port C is connected to port D (solid lines). In the heating mode, port A is connected to port C and port B is connected to port D (dash lines). In all drawings FIGS. 1-6, the chiller operates in the cooling mode.

Chiller in FIG. 1 includes a closed refrigerant circuit. In the cooling mode hot vapor refrigerant after compressor 1 flows to an air-refrigerant heat exchanger 3 that operates as a condenser cooling and condensing refrigerant vapor while rejecting heat to airflow 9 moving through air-refrigerant heat exchanger 3 by a fan 11. Another design of the condenser that is not shown in FIG. 1 may use a water circuit wherein water moves after absorbing heat from the condenser to a cooling tower rejecting heat to ambient before returning to the condenser. After air-refrigerant heat exchanger 3 refrigerant flows to an expansion device 5 and expands there. When the chiller operates in both the cooling and heating modes, expansion device 5 is either bidirectional or consists of two devices, each is in proximity to a corresponding evaporator and one expands refrigerant in the cooling mode and allows bypassing in the heating mode while another expands refrigerant in the heating mode and bypasses refrigerant in the cooling mode. After expansion device 5, mix of vapor and liquid refrigerant moves to a liquid-refrigerant heat exchanger 7 that operates as an evaporator evaporating liquid refrigerant and absorbing heat from water or brine. After evaporator, refrigerant vapor goes to the compressor suction.

Closed liquid circulation system 30 (FIGS. 1 and 2) includes a pump 31, pipes 32, 34, 36, 38, 39 and valves 33, 35, 37. Cold water or brine enters, via pipes 34, a first supply air heat exchanger 29 cooling and dehumidifying supply airflow in supply airflow duct 23. After absorbing heat from supply air, system 30 delivers water or brine to cooling means in the conditioning space, for example, fan coil units via pipe 36, and returns water or brine to liquid-refrigerant heat exchanger 7 via pipes 32. With additional piping liquid flow through heat exchanger 29 and fan coil units may be parallel, in series, or arranged in a parallel-series way, and can be made variable by closing and opening valves 33, 35, 37 and changing speed of pump 31. Humidity sensor 22 helps keeping correct cooling liquid flow rate through the first supply air heat exchanger 29. Liquid circulation system 30 may also include other components, not shown in FIGS. 1 and 2. It could be a liquid reservoir, pressure relief tanks and valves, extra pumps and pipes, water or brine refill means, water heaters, etc.

An exhaust-supply air system consists of exhaust 21 and supply 23 air ducts, and exhaust and supply fans or blowers (not shown in FIGS. 1 and 2). There could be also filters, silencers, means for air intake and exhaust to ambient, means for defrosting air exhaust duct, etc. However, parts depicted in FIG. 1 include only sensors and hardware related to control and management of supply air temperature and humidity that are the subject of the present invention. In addition to air ducts, FIG. 1 shows a recuperator 27 that is an air-to-air heat exchanger heating supply air with heat carried by exhaust air when outdoor air is colder than indoor air and chilling supply air when outdoor air is warmer than indoor. Recuperator with membranes permeable for vapor may also have some degree of absorbing or rejecting moisture from supply air. However, these membranes may be permeable also for $CO_2$ and other wasted gaseous products from the building inhabitants and activities. Humidification means 28 humidify supply air when ambient air humidity drops too low (mostly, in winter). Sensor 22 controls supply airflow humidity after dehumidification in heat exchanger 29 or humidification with humidification means 28.

In addition to the parts shown in FIG. 1, FIG. 2 depicts components of a heat utilization system 40 utilizing heat of the refrigeration cycle to warm water or brine, and a system 50 delivering this liquid to tune temperature of supply air and air inside the conditioning space of the building.

FIGS. 2 and 3 show the chiller 110 with an addition of heat utilization system 40. Additional equipment in the closed refrigerant circuit of the chiller includes an economizer 43 positioned downstream of the air-refrigerant heat exchanger 3 and upstream of the expansion device 5, and a bypass line 48 with a shut-off valve 41. Hot liquid refrigerant is subcooled after condenser in economizer 43 rejecting heat to liquid flow that reaches economizer 43 via pipe 52, absorbs heat from refrigerant and leaves economizer via pipe 54. Both pipes 52 and 54 are parts of hot liquid delivering system 50 (FIG. 2). System 50 with a pump 51 delivers warm liquid to a second supply air heat exchanger 24 that reheats to desirable temperature supply airflow cooled and dehumidified in first supply air heat exchanger 29. Temperature sensor 26 assists in the proper reheating sending signals to control liquid flow through heat exchanger 24. Besides heat exchanger 24, warm liquid may flow to other users, including fan coils, reheating air after the coils. It could be alternative equipment for conditioning air inside the building, instead of fan coils, that also requires air reheating. Another application of warmed liquid use may be for commercial or personal needs such as showers, baths, and kitchens. In these applications, liquid in the heat utilization system 40 and open delivery circuit 50 (FIG. 2) is water. If heated liquid is used for air reheating only, the liquid can be either water or brine, and systems 40, 50 are open or closed. Delivering system 50 includes pipes 52, 54, 56, 58, 59 and valves 53, 55, 57. After second supply air heat exchanger 24, liquid either flows to other users inside the building or returns to economizer 43 via pipes 52. If there are other users, liquid flow TO heat exchanger 24 and to these users may be arranged in parallel, or in series, or in parallel-series manner. Closing valves 53, 55, 57, completely or partially, opening them, and/or changing speed of pump 51 adjusts liquid flow through heat exchanger 24 and to the other users. Hot water or brine delivering system 50 may also include other components not shown in FIG. 2. It could be a reservoir to accumulate hot liquid and distributing it to the users, pressure relief tanks and valves, extra pumps and pipes, water or brine refill means, water heaters, etc.

Figure 5B:
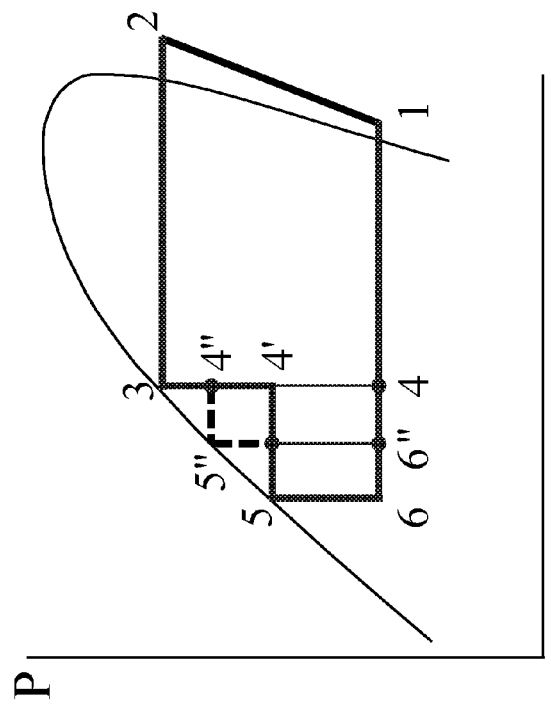
FIG. 5b is a P-H diagram of a refrigeration cycle the chiller of FIG. 4 operates.
Figure 5A:
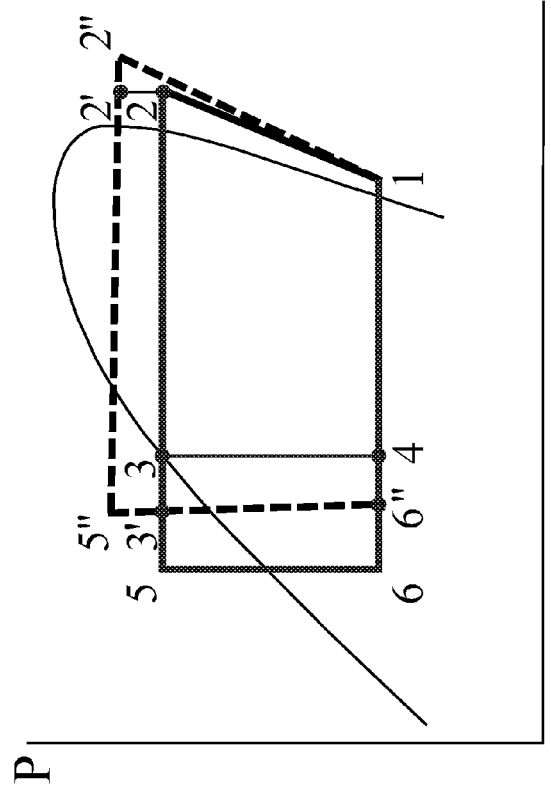
FIG. 5a is a pressure-enthalpy (P-H) diagram of a refrigeration cycle the chiller of FIG. 3 operates.

FIG. 3 and FIG. 5a explain operation of chiller 110 with economizer 43. Economizer 43 in FIG. 3 can be of shell-and-tube, plate-and-frame, plate-fin or any other type suitable for liquid-to-liquid heat transfer. When there is a need in warmed water in the cooling mode, shut off valve 41 closes bypass line 48, and economizer 43 operates as a subcooler. This operation not only provide users with water heated with utilized heat but also increases cooling capacity of the chiller above a level that can be achieved in a refrigerant cycle without subcooling (cycle 1-2-3-4-1 in FIG. 5a vs subcooling cycle 1-2-5-6-1). Segment 6-4 shows capacity increase. As the capacity growth does not lead to any considerable increase in compressor power, subcooling improves efficiency of the air conditioning system also. While there is no need for heated liquid, shut off valve 41 opens, refrigerant flows through line 48, and economizer 43 becomes a liquid refrigerant receiver.

However, use of the economizer as a subcooler may have also a drawback. In chiller 110 of FIG. 3, liquid receiver cannot be installed after the subcooler, because liquid refrigerant travels from the subcooler to the receiver zeroing both, energy saving and capacity improvement through subcooling. That is a fundamental problem with variable amount of utilized heat. Liquid refrigerant before the expansion device 5 shall fill economizer 43, and pipes 4, 48, and 8. The maximum heat utilization depicted in FIG. 5a, as segment 5-3, requires the maximum refrigerant charge, because amount of liquid refrigerant in the evaporator is also maximal (segment 5-3 equals to segment 6-4). If users consume only a part of heat available for utilization, the evaporator requires lesser amount of liquid refrigerant that creates extra refrigerant in the refrigerant circle. Because the economizer/subcooler and all refrigerant pipes downstream of the condenser and before expansion device 5 are always filled up, extra refrigerant must be squeezed in condenser 3. That leads to increased condensing pressure (line 2"-5" vs line 2-5 in FIG. 5a), increased compressor discharge pressure, compressor power (sector 2'-2"), and reduction in the system efficiency.

A design alternative to the chiller of FIG. 3 is developed in order to eliminate aforesaid drawback and presented in FIG. 4. In addition to the parts of the chiller with subcooling, chiller 210 includes a second expansion device 105 and a receiver 104. Chiller 210 uses the refrigeration cycle with two consecutive expansions that originally introduced in U.S. Pat. No. 8,117,855. Chiller 210 in the cooling mode with heat utilization operates with the following steps:

Compressing vapor refrigerant in compressor 1.
Desuperheating and condensing hot refrigerant vapor in air-refrigerant heat exchanger 3 that operates as a first condenser rejecting heat to ambient air.
Flowing liquid refrigerant after heat exchanger 3 to second expansion device 105.
Expanding liquid refrigerant in expansion device 105 with lowering refrigerant temperature.
Delivering mixture of liquid and vapor refrigerant to economizer 43.
Recondensing vapor refrigerant in economizer 43 that operates as a second condenser heating water while absorbing heat of condensation.
Flowing liquid refrigerant to the first expansion device 5.
Expanding liquid refrigerant in expansion device 5 with lowering refrigerant temperature.
Delivering mixture of liquid and vapor refrigerant to liquid-refrigerant heat exchanger 3.
Evaporating liquid refrigerant, absorbing heat from the secondary refrigerant, cooling this refrigerant and delivering the secondary refrigerant for air conditioning.
Flowing vapor refrigerant to compressor 1.

FIG. 5b depicts operation cycle of the chiller 210 (FIG. 4). With the maximum heat utilization (segment 5-4') and capacity increase (segment 6-4), length of these segments are identical to the length of segments 5-3 and 6-4 in diagram 5a for chiller 110 of FIG. 3. However, unlike chiller 110 in FIG. 3, chiller 210 does not have problems with variable amount of utilized heat. When utilized heat is reduced, refrigerant surplus is accommodated in receiver 104, thus, condensing temperature and power are not impacted by extra liquid refrigerant.

Same method with the described above steps can be implemented also in air conditioners without the secondary refrigerant circuit as in roof or central, or split air conditioners. Besides of systems requiring heat utilization, air conditioner or chiller of FIG. 4 also can be used even without heat utilization in systems with considerable capacity variation. In these systems, economizer 43 is substituted with a heat exchanger cooled by the either the same as a regular condenser media, or an alternative media, and together with a variable speed compressor and a variable speed fan helps efficiency optimization.

For some hot water users, for example, for kitchens and showers, liquid after economizer has to have higher temperature. One way is to heat up this water in an electric or a gas heater, but the method with two consecutive expansions offered in chiller 210 schematics allows heating up water without consuming additional energy.

FIG. 6 depicts such a chiller. Chiller 310 uses refrigeration cycle with two consecutive expansions also; however, heat utilization of system 240 is different. System 240 includes an additional heat exchanger 203 located downstream of compressor 1 and upstream of condenser 3. Cold water or brine comes to chiller 310 via line 252, goes to economizer 43, wherein heating liquid absorbs heat from recondensing refrigerant. Then liquid, initially warmed in economizer 43, flows to heat exchanger 203 where it heats up absorbing heat from hot vapor refrigerant discharged from compressor. Here, liquid temperature can reach a temperature of 40-50° C. or even exceed it. Refrigerant leaves heat exchanger 203 partially or completely desuperheated and, sometimes, even partially condensed. In the first condenser 3, ambient air absorbs the heat from refrigerant desuperheating and/or condensing that is not picked up in heat exchanger 203 with liquid. After heat exchanger 203, hot liquid goes to users via pipe 254 or to a hot liquid accumulation reservoir (not shown in the illustrative drawings). If there is no need in heating up liquid in heat exchanger 203, hot liquid bypass line valve 215 is fully open. Alternatively, if it is necessary to heat water to desirable temperature that is below the maximum temperature, valve 215 is partially open.

While preferred embodiments of the invention have been described above in details, it will be understood that many modifications can be made to the illustrated systems without departing from the spirit and scope of the invention.

What we claim are:

1. Air-conditioning system controlling both air temperature and humidity, the system operating in a cooling mode rejecting heat from a building, the system comprising of:
   a chiller with a closed refrigerant circuit having main parts that include a compressor, an air-refrigerant heat exchanger, a first expansion device, a liquid-refrigerant heat exchanger, and refrigerant pipes, and wherein hot vapor refrigerant from compressor discharge travels to the air-refrigerant heat exchanger that operates as a condenser, cooling and liquefying refrigerant with ambient air, then liquid refrigerant flows to the first expansion device, expands there, then mixture of vapor and liquid refrigerant flows to the liquid-refrigerant heat exchanger that operates as an evaporator evaporating liquid refrigerant while absorbing heat from a secondary refrigerant that is at least one of water and brine and cooling the secondary refrigerant, and returning refrigerant vapor to the compressor through a compressor suction;
   building ventilation system to provide space inside the building with preconditioned fresh air in the cooling mode that includes a supply air duct, a fan or blower, means for air intake, a first supply air heat exchanger that exclusively cools and dehumidifies fresh supply air with the secondary refrigerant cooled in said chiller, and means to drain condensate from said first supply air heat exchanger;
   a means for conditioning air in the space inside the building;
   a closed circuit means for circulating and delivering the cold secondary refrigerant to both: the first supply air heat exchanger and to the means for conditioning space inside of the building;
   control system that includes temperature and humidity sensors.

2. Air-conditioning system according to claim 1, wherein the chiller operates in in the cooling mode and a heating mode to chill and warm the space inside the building, respectively and wherein said chiller is equipped with a reversing valve that connects the compressor discharge in the heating mode with the liquid-refrigerant heat exchanger operating in said heating mode as a condenser, thereby cooling and condensing hot vapor refrigerant and rejecting heat to the secondary refrigerant, thus heating said secondary refrigerant, and connecting fluidly compressor suction to the air-refrigerant heat exchanger that operates as an evaporator absorbing heat from ambient.

3. Air-conditioning system according to claim 1, wherein the building ventilation system includes an exhaust air duct, an exhaust fan or blower, means for air exhaust, and a recuperator that is in heat exchange relations with exhaust and supply airflows and positioned upstream of the first supply airflow heat exchanger to cool supply air in the cooling mode rejecting heat to chilled exhaust air and to warm supply air in the heating mode absorbing heat from warmed exhaust air.

4. Air-conditioning system according to claim 2, wherein the building ventilation system includes a humidification means positioned in the supply airstream to precondition fresh supply air in the heating mode thereby increasing humidity of said fresh supply air.

5. Air-conditioning system according to claim 1, wherein the building ventilation system includes a second supply air heat exchanger downstream of the first fresh supply air heat exchanger to further precondition supply air warming it up after dehumidification; and the chiller includes an economizer with the at least one of water and brine in heat transfer relations with refrigerant utilizing heat from said refrigerant; and a hot liquid circuit means to circulate and deliver the at least one of water and brine heated in the economizer for reheating air chilled in the means for conditioning space inside at least one of the building and in the second supply air heat exchanger.

6. Air-conditioning system according to claim 5, wherein the economizer positioned downstream of the compressor and upstream of the air-refrigerant heat exchanger partially condenses and/or desuperheats hot refrigerant vapor upstream of the air-refrigerant heat exchanger.

7. Air-conditioning system according to claim 5, wherein said economizer is positioned downstream of the air-refrigerant heat exchanger and upstream of the first expansion device and operates in the cooling mode as a subcooler to subcool liquid refrigerant after the air-refrigerant heat exchanger, and to warm the at least one of water and brine utilizing heat absorbed from refrigerant.

8. A method for conditioning air with heat utilization in the cooling mode including the following steps:
   compression of refrigerant vapor in a compressor,
   desuperheating and condensing refrigerant vapor in a first condenser,
   expanding liquid refrigerant in a first expansion device,
   recondensing refrigerant vapor after the first expansion device in an economizer operating as a second condenser and cooled with at least one of water and brine absorbing heat of condensation,
   expanding liquid refrigerant in a second expansion device,
   evaporating liquid refrigerant in an evaporator and returning refrigerant vapor to the compressor.

9. Air-conditioning system according to claim 5, wherein the chiller includes a second expansion device positioned downstream of the air-refrigerant heat exchanger and upstream of the economizer whereby that refrigerant vapor in liquid and vapor refrigerant mix after the first expansion device condenses in the economizer that operates as an additional condenser.

10. Air-conditioning system according to claim 9, wherein the chiller includes a receiver positioned downstream of the economizer and upstream of the first expansion device to accumulate excessive refrigerant.

11. Air-conditioning system according to claim 10, wherein the chiller further includes a bypass line with a shutoff valve connecting the first expansion device with the air-refrigerant heat exchanger; the bypass line bypassing the second expansion device, the economizer, and the receiver in at least one of the heating mode and the cooling mode when there is no request for utilized heat.

12. Air-conditioning system according to claim 11, wherein the chiller includes a utilization heat exchanger positioned downstream of the compressor and upstream of the air-refrigerant heat exchanger; and wherein the hot liquid circuit means deliver at least one of water and brine, preheated in the economizer, to the utilization heat exchanger for heating up said liquid refrigerant, then deliver liquid heated in said utilization heat exchanger either to a hot liquid accumulation reservoir or straight to hot water users, and refill the system with at least one of fresh liquid and cooled liquid.

* * * * *